US008007155B2

(12) United States Patent
Bolander, Jr. et al.

(10) Patent No.: US 8,007,155 B2
(45) Date of Patent: Aug. 30, 2011

(54) CAMOUFLAGED COMPOSITE MILITARY VEHICLE LAMP

(75) Inventors: Albert J. Bolander, Jr., Memphis, IN (US); Matthew E. Drake, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 757 days.

(21) Appl. No.: 12/024,224

(22) Filed: Feb. 1, 2008

(65) Prior Publication Data
US 2009/0052199 A1 Feb. 26, 2009

Related U.S. Application Data

(60) Provisional application No. 60/887,673, filed on Feb. 1, 2007.

(51) Int. Cl.
*F21S 8/10* (2006.01)
(52) U.S. Cl. ........ 362/545; 362/230; 362/231; 362/465; 362/507; 362/509; 362/510; 362/538; 362/539; 362/540; 362/541; 362/542; 362/543; 362/544
(58) Field of Classification Search .................. 362/465, 362/507, 509, 510, 538–548, 545, 544, 520, 362/521, 230, 231, 240, 244, 800
See application file for complete search history.

(56) References Cited

U.S. PATENT DOCUMENTS

| 4,277,819 A | * | 7/1981 | Sobota et al. ........ 362/545 |
| 5,144,877 A | * | 9/1992 | Parks ........ 89/36.01 |
| 5,528,474 A | | 6/1996 | Roney et al. |
| 5,567,036 A | | 10/1996 | Theobald et al. |
| 5,632,551 A | | 5/1997 | Roney et al. |
| 5,890,794 A | | 4/1999 | Abtahi |
| 6,241,373 B1 | | 6/2001 | Kelley et al. |
| 6,367,949 B1 | | 4/2002 | Pederson |
| 6,550,949 B1 | * | 4/2003 | Bauer et al. ........ 362/545 |
| 2002/0093820 A1 | | 7/2002 | Pederson |
| 2003/0218882 A1 | * | 11/2003 | Wirth et al. ........ 362/329 |
| 2005/0018441 A1 | * | 1/2005 | Menke et al. ........ 362/493 |
| 2009/0200496 A1 | * | 8/2009 | Barie et al. ........ 250/495.1 |

OTHER PUBLICATIONS

International Search Report for PCT/US2008/52824, mail date Sep. 24, 2008, 3 pages.
Written Opinion of the International Searching Authority for PCT/US2008/52824, mail date Sep. 24, 2008, 6 pages.

* cited by examiner

*Primary Examiner* — Ali Alavi
*Assistant Examiner* — Mary Zettl
(74) *Attorney, Agent, or Firm* — Woodard, Emhardt, Moriarty, McNett & Henry LLP

(57) ABSTRACT

A composite lamp assembly for use on a camouflaged military vehicle comprises a lamp housing colored to match the camouflaged scheme of the vehicle. The lamp housing defines an interior space, a first opening and a plurality of second openings in communication with the interior space. The lamp assembly includes a clear lens attached to the housing to occupy the first opening and a plurality of diffusers attached to the housing to occupy the plurality of second openings, the diffusers being colored to match the camouflaged scheme of the vehicle. The lamp assembly further includes a circuit board arranged within the interior space of the lamp housing having first and second pluralities of LEDs mounted thereto. The first plurality of LEDs is positioned to provide light through the clear lens and the second is positioned to provide light through the diffusers.

31 Claims, 2 Drawing Sheets

US 8,007,155 B2

CAMOUFLAGED COMPOSITE MILITARY VEHICLE LAMP

CROSS-REFERENCE TO RELATED APPLICATIONS

This application is based on provisional patent application Ser. No. 60/887,673, filed Feb. 1, 2007, and priority and the benefit of Ser. No. 60/887,673 is claimed in the present application to the extent the subject matter of this application is found in that provisional application. The content of these applications is incorporated herein by reference.

TECHNICAL FIELD

The present disclosure generally relates to vehicle lamps and, more particularly, to a camouflaged composite military vehicle lamp.

BACKGROUND

Blackout lamps are commonly used on military vehicles in situations where it is desired to maneuver at night while producing minimal light, while at the same time providing safety for other vehicles following in a convoy formation. Typical blackout lamps for the rear of a military vehicle comprise two housings on either side of the rear of the vehicle, with each housing incorporating two red transparent filter panels with one or more incandescent lamps mounted behind each panel or light emitting diodes mounted behind a white (not clear) lens. Illumination of the incandescent lamps, which produce broad spectrum light, is filtered through the red panels in order to transmit only red light. Illumination of the light emitting diodes diffusely transmits light through the white panels. The lamps are illuminated at low light levels in order to not produce excessive light, which could alert an enemy to the presence of the vehicle. Such lamps also typically have visors protruding from the housing above the blackout lamp panels or the blackout lamps are recessed within the housing in order to limit identification of the lamps from the air. The housings also typically hold standard rear stop/tail/turn lights or front park/turn lights for use during the day and/or when blackout conditions are not warranted.

The prior art lamps are effective for camouflaging the vehicle while operating at night. However, the lamps do not provide adequate camouflage for the vehicle during the day. The military goes to great lengths to paint the vehicles in colors and patterns that make them difficult to spot in the area of anticipated operation, but the lamps on the vehicle are not well camouflaged and therefore compromise the safety of those operating the vehicle. In fact, because the lamps require an opening in the armor of the vehicle, they become targets for the enemy to aim their weapons at in hopes of penetrating the vehicle armor.

Some of the deficiencies in the prior art lamps used on military vehicles include the fact that the stop/tail/turn lamps are covered by red and/or amber lenses which provide the desired colored appearance to the incandescent white lamps mounted behind the lenses. These colored lenses deviate from the camouflaged appearance of the rest of the vehicle, thereby making the vehicle easier to spot by the enemy. Furthermore, the lenses are made from an optical grade material that is very good at reflecting light which impinges upon its surface from a source external to the lamp. Such reflections off of the lamp lenses also make the vehicle easier to spot. Similarly, the blackout lamps are covered by red or white lenses and are made from plastic with a reflective surface, causing the same problems noted above with respect to the stop/tail/turn lamps. The white lenses also provide a very high contrast with the remaining lamp housing, further drawing attention to the lamp.

Improvements in these areas are therefore needed.

SUMMARY

In certain embodiments, a composite lamp assembly for use on a camouflaged military vehicle comprises a lamp housing colored to match the camouflaged scheme of the vehicle. The lamp housing defines an interior space, a first opening and a plurality of second openings in communication with the interior space. The lamp assembly further includes a clear lens attached to the housing to occupy the first opening, and a plurality of diffusers attached to the housing to occupy the plurality of second openings. The diffusers are also colored to match the camouflaged scheme of the vehicle. The lamp assembly also includes a circuit board arranged within the interior space of the lamp housing. Additionally, a first plurality of colored LEDs are mounted on the circuit board and positioned to provide non-white light through the clear lens, and a second plurality of colored LEDs are mounted on the circuit board and positioned to provide non-white light through the diffusers.

In certain embodiments, a composite lamp assembly for use on a camouflaged military vehicle comprises a lamp housing colored to match the camouflaged scheme of the military vehicle. The lamp housing defines an interior space and includes a clear lens and at least one diffuser, the diffuser being colored to match the camouflaged scheme of the military vehicle. The assembly also includes a camouflaged component arranged within the interior space and positioned behind the clear lens such that at least a portion of the component is at least slightly visible through the clear lens, the camouflaged component being colored to match the camouflaged scheme of the military vehicle. Additionally, the assembly includes a first LED arranged within the interior space and positioned to provide light through the clear lens, and a second LED arranged within the interior space and positioned to provide light through the diffuser.

In certain embodiments, a composite lamp assembly for use on a camouflaged military vehicle comprises a first lamp portion operable to indicate at least the presence, turning and stopping of the vehicle, and a second lamp portion operable to indicate at least the presence and stopping of the vehicle during nighttime convoy travel. The first lamp portion includes at least a first colored LED mounted within a camouflaged lamp housing and a clear lens covering the first colored LED. The first colored LED is operable to emit non-white light directed at the clear lens. The second lamp portion includes at least a second colored LED mounted within the camouflaged lamp housing and at least one camouflaged diffuser covering the second colored LED. The second colored LED is operable to emit non-white light directed at the diffuser.

In certain embodiments, a lamp assembly for use on a camouflaged military vehicle comprises a lamp housing colored to match the camouflaged scheme of the vehicle. The lamp housing defines an interior space and a plurality of openings in communication with the interior space to provide blackout lighting. The lamp assembly further includes at least one diffuser attached to the housing to occupy the plurality of openings, the diffuser also being colored to match the camouflaged scheme of the vehicle. Additionally, the lamp assembly includes a circuit board arranged within the interior space of the lamp housing, with a plurality of colored LEDs mounted on the circuit board and positioned to provide non-white light through the diffuser. The assembly further includes at least one camouflaged visor attached to the housing above the diffuser to reduce the visibility of non-white light emitted from the colored LEDs from above the lamp assembly.

In certain embodiments, a method comprises providing rear and front housing components of a lamp assembly to be mounted on a vehicle, the rear and front housing components being colored to match the camouflaged scheme of the vehicle. The front housing component defines a first larger hole and a plurality of second smaller holes. The method further comprises positioning a circuit board between the components, the circuit board having a first plurality and a second plurality of colored LEDs mounted thereto. Additionally, the method comprises attaching a clear lens to the front housing component such that the lens covers the first hole. The first plurality of colored LEDs is positioned on the circuit board to emit non-white light directed at the clear lens. The method also includes attaching a plurality of diffusers to the front housing component such that the diffusers cover the plurality of second holes. The diffusers are also colored to match the color of the rear and front housing components. Additionally, the second plurality of colored LEDs is positioned on the circuit board to emit non-white light directed at the diffusers. The method further includes connecting together the rear and front housing components to form the lamp assembly.

In certain embodiments, a method comprises providing rear and front housing components of a lamp assembly to be mounted on a vehicle. The front housing component defines a hole and the rear and front housing components are colored to match the camouflaged scheme of the vehicle. The method also includes positioning a circuit board between the components, the circuit board having a first plurality and a second plurality of colored LEDs mounted thereto. Additionally, the method includes attaching a clear lens to the front housing component such that the lens covers the first hole, the first plurality of colored LEDs being positioned on the circuit board to emit non-white light directed at the clear lens. The method further includes forming a plurality of diffusers in the front housing component, the diffusers being colored to match the color of the rear and front housing components. The second plurality of colored LEDs is positioned on the circuit board to emit non-white light directed at the diffusers. The method also includes connecting together the rear and front housing components to form the lamp assembly.

DESCRIPTION OF THE VARIOUS EMBODIMENTS

Figure 1:
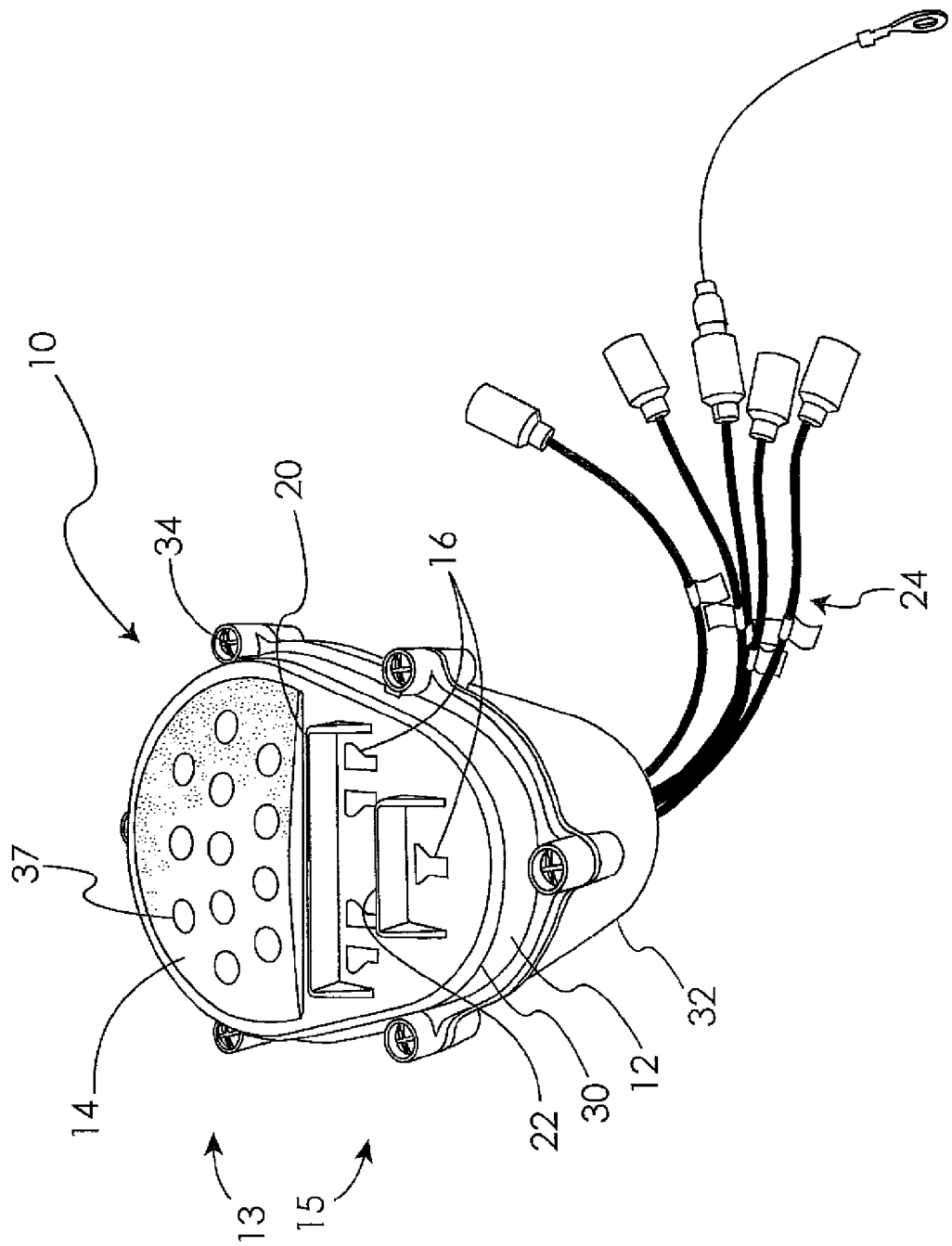
FIG. 1 is a perspective view of a composite military vehicle lamp.

For the purposes of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates are intended to be protected.

The present disclosure is generally directed to a military vehicle lamp assembly having a lamp housing colored to match the camouflaged scheme of the military vehicle, the lamp housing containing a circuit board with first and second sets of light emitting diodes ("LEDs") mounted thereto. In certain embodiments, the LEDs are colored such that they emit non-white light, such as red, amber, or other desired light colors. In certain other embodiments, one or more of the LEDs may emit white light. The lamp assembly includes a clear lens positioned with respect to the housing to cover the first set of LEDs, and a plurality of camouflaged diffusers positioned with respect to the housing to cover the second set of LED's. Accordingly, the camouflaged housing and diffusers along with the clear lens create a camouflaged composite lamp assembly, providing increased safety for the vehicle during the daylight hours.

Figure 2:
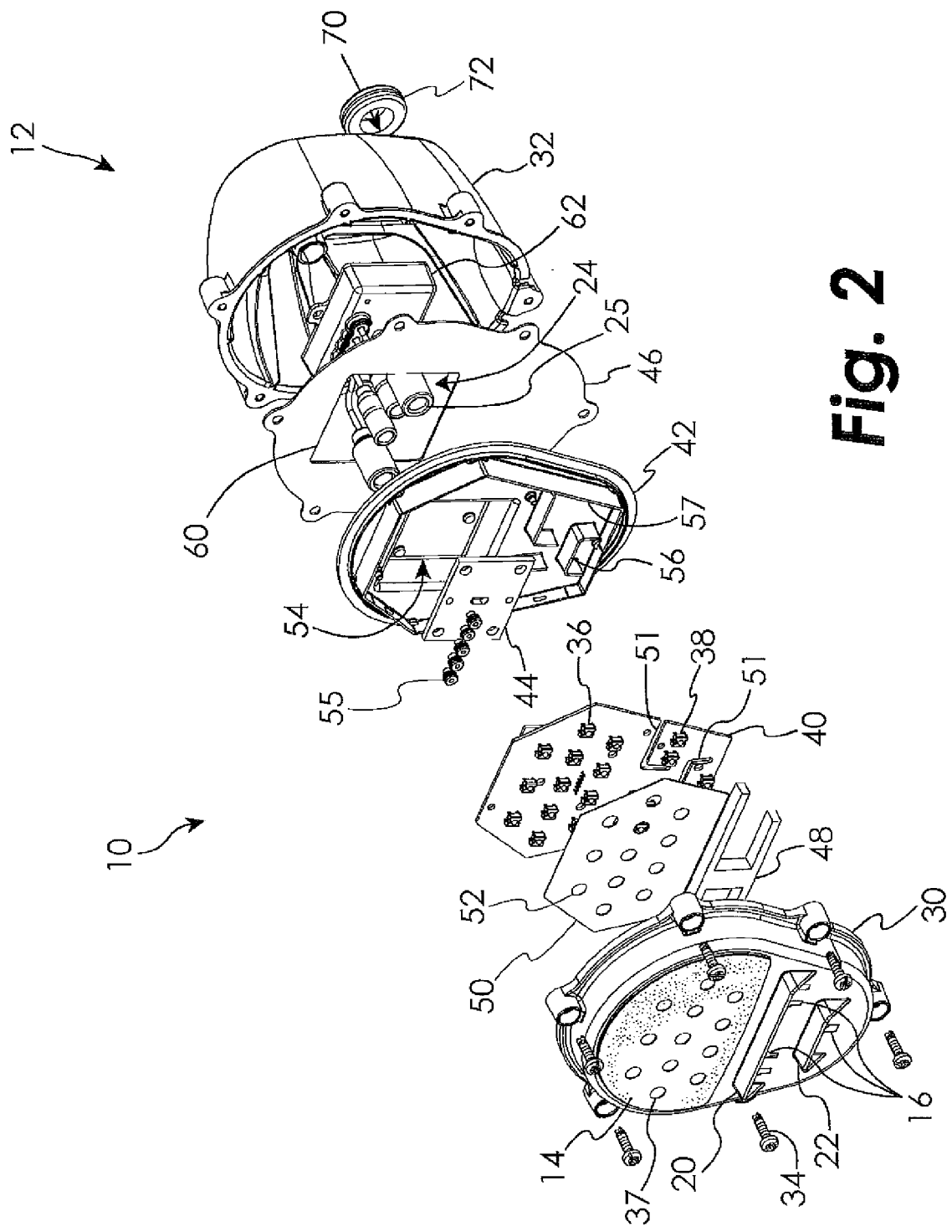
FIG. 2 is an exploded, perspective view of a composite military vehicle lamp according to the embodiment illustrated in FIG. 1.

Referring generally to FIGS. 1-2, there is shown an embodiment of a camouflaged vehicle lamp according to the present disclosure, indicated generally at 10. Lamp 10 has a housing 12 made from a suitable material, preferably a weather-resistant plastic as is known in the art. In some embodiments, housing 12 is formed in a color that matches the camouflage scheme of the vehicle into which it is to be mounted. For example, housing 12 may be formed in a sand color that matches the vehicle paint used by United States military forces in the Middle East.

In the illustrated embodiment, lamp 10 includes an upper portion 13 and a lower portion 15. Upper portion 13 typically provides for the standard vehicle indicating functions. In the illustrated example, lamp 10 is configured to placement at the rear of the military vehicle. Accordingly, upper portion 13 includes the standard stop/tail/turn functions to indicate or signal the stopping, presence, and/or turning of the vehicle. The present disclosure contemplates use and placement of the lamp at the front of the military vehicle. In such cases, the upper portion would include the standard park/turn functions to indicate or signal the parking and/or turning of the vehicle. To accomplish these functions, the upper portion includes a first plurality of LEDs 36 covered by a clear lens 14, with camouflage color showing through the lens. By using clear lens 14 with camouflage color showing through, the camouflaging of lamp 10 is improved. Additionally, in situations where colored light is desired, by using colored LEDs lens 14 is not required to be formed in a color that contrasts with the housing 12 color, thereby improving the camouflaging of lamp 10.

Lower portion 15 of the lamp 10 includes the blackout function which allows the vehicle to be used in situations where it is desired to minimize the amount of light produced by the vehicle while still providing safety for a vehicle following closely behind. At the rear of the vehicle, the blackout function of lamp 10 may include stop/tail lighting, while at the front of the vehicle the blackout function of lamp 10 may include park lighting. To accomplish the blackout function, lower portion 15 includes a second plurality of LEDs 38 covered by light diffusers 16. Diffusers 16 are colored to match the color of housing 12, and thus colored to match the camouflaged scheme of the vehicle. Additionally, diffusers 16 may include reduced-opacity, as compared to housing 12, to allow a desired amount of light from LEDs 38 to be visible through the housing when they are activated. In situations where colored light is desired, by using colored LEDs, diffusers 16 are not required to be formed in a color that contrasts with the housing 12 color, thereby improving the camouflaging of lamp 10. It should be appreciated that in other embodiments the functions and configurations of the upper and lower portions can be reversed on the lamp. In yet other embodiments, the upper and lower portions, corresponding to the standard vehicle functions and blackout function, may be provided in separate housings rather than portions of a composite lamp.

In the illustrated embodiment, housing 12 includes a front housing component 30 and optionally a bucket or rear housing component 32. In certain embodiments, housing components 30 and 32 may be connected together through the use of screws 34. However, it should be appreciated that the housing can be configured differently as would occur to one skilled in the art, such as having more components, the front and rear components being integrally formed as a unitary piece, or consisting of only the front housing component. Lens 14 and diffusers 16 may be insert-molded to front housing component 30 to cover, at least substantially, corresponding larger and smaller holes, respectively, defined in front housing component 30. In certain embodiments, diffusers 16 may be at least partially recessed within front housing component 30. However, it should be appreciated that lens 14 and diffusers 16 may be attached or otherwise connected with front housing component 30 in other appropriate manners, or may be integral with front housing component 30, as would occur to one skilled in the art. As an example, in other embodiments, diffusers 16 may be portions or areas of front housing component 30 of decreased thickness and/or reduced opacity. Front housing component 30 may optionally include camouflaged visors 20 and 22 to assist in reducing the visibility of the blackout function lights from the air by shielding the light emitted from LEDs 38 through diffusers 16.

As used herein, clear lens 14 refers to a non-colored lens. In that way, one or more camouflaged components positioned within housing 12 is (completely, predominantly or partially) visible through clear lens 14 to camouflage the lamp 10. It is contemplated that in certain embodiments clear lens 14 may be completely, predominantly or partially transparent. Additionally, it is contemplated that in certain embodiments clear lens 14 may be completely, predominantly or partially translucent. Further, it is contemplated that in certain embodiments clear lens 14 may include a combination of transparency and translucency. In some embodiments, lens 14 may be made (completely, predominantly or partially) textured with a roughened, frosted or otherwise predominantly non-reflective surface that will significantly diffuse any external light impinging upon its surface. Housing 12 may also be made (completely, predominantly or partially) from a textured material that is predominantly non-reflective. Optionally, lens 14 can include optics 37 corresponding to LEDs 36 to enhance and/or distribute the light emitted from LEDs 36. In certain embodiments, optics 37 may be free from the non-reflective, textured effect applied to the remainder of lens 14. Lens 14 and diffusers 16 may each be made from a suitable material, such as plastic.

FIG. 2 illustrates an exploded view of one embodiment of the vehicle lamp according to the present disclosure. It should be appreciated that the configuration illustrated in FIGS. 1-2 is just one example of many different possible configurations of the vehicle lamp. In most cases, the electrical components of the vehicle lamp and configurations thereof can be arranged as desired and remain within the purview of the present disclosure. As illustrated in FIG. 2, in one example embodiment, camouflaged vehicle lamp 10 may include a circuit board 40, an intermediate housing component 42 with plate 44, and a gasket 46 positioned between front and rear housing components 30 and 32. Optionally, lamp 10 may also include a light shield 48 for the second plurality of LEDs 38 and a mask 50 for the first plurality of LEDs 36. In other embodiments, the lamp according to the present disclosure is embodied as front housing component 30, circuit board 40 with LEDs 36 and 38, and intermediate housing component 42, with gasket 46, shield 48 and mask 50 optionally included, and rear housing component 32 not included.

As illustrated, circuit board 40 includes LEDs 36 and 38 mounted thereto. The first plurality of LEDs 36 are positioned on circuit board 40 to emit light directed at lens 14, and second plurality of LEDs 38 are positioned on circuit board 40 to emit light directed at the corresponding diffusers 16. Circuit board 40 may define channels 51, as will be discussed in greater detail. Circuit board 40 may be shaped, sized and electrically configured as would occur to one skilled in the art, with the illustrated embodiment showing only an example of one possible version of the circuit board.

LEDs 36 and 38 may be selectively illuminated to provide light through lens 14 and diffusers 16, respectively. LEDs 36 and 38 may be colored LEDs to emit non-white light, such as red or amber light as examples. It should be appreciated, however, that some or all of the LEDs may be white LEDs operable to emit white light. In certain situations, such as braking for example, it may be desirable and/or required to produce colored light from lamp 10. By using colored LEDs, lens 14 may be clear (i.e. uncolored) and diffusers 16 may be camouflage-colored. As will be appreciated, the use of colored LEDs with clear, non-reflective lens 14 and camouflaged diffusers 16 will significantly reduce the visibility of lamp 10 while on the camouflaged vehicle, at least because the need for colored lenses and diffusers is eliminated. It is contemplated that in certain other situations, such as reversing a vehicle, it may be desirable and/or required to produce white light from lamp 10, in which case the LEDs may include one or more white light-producing LEDs. In the illustrated embodiment, there are five diffusers 16 corresponding to and aligned with five LEDs 38, with four diffusers/LEDs being positioned above one centered diffuser/LED. It is contemplated that there could be a greater or smaller number of diffusers and corresponding LEDs as desired to provide the blackout function of the lamp. As an example, in certain embodiments, there could be a single LED 38. It is also contemplated that there could be a single LED used within lamp 10, such that LEDs 36 and 38 are replaced with one LED.

Shield 48 may be positioned between circuit board 40 and front housing component 30 to shield and/or substantially prevent light emitted from LEDs 38 from passing through lens 14. During operation of the blackout function of lamp 10, it is generally desirable for light emitted from LEDs 38 to pass only through the corresponding diffusers 16, and not lens 14. Accordingly, shield 48 may be designed to direct light emitted from LEDs 38 toward diffusers 16 and shield the light from passing through lens 14.

Generally aligned with shield 48, lamp assembly 10 may optionally include a mask 50 also positioned between circuit board 40 and front housing component 30. In the illustrated embodiment, mask 50 defines holes 52 corresponding to LEDs 36, such that light emitted from LEDs 36 passes through holes 52 and then lens 14. Accordingly, there are twelve illustrated holes 52 corresponding to the twelve illustrated LEDs 36. Additionally, there are twelve illustrated optics 37 on lens 14 corresponding to the twelve illustrated LEDs 36. However, it should be appreciated that optics 37, holes 52 and LEDs 36 could number greater or less than twelve as would generally occur to one skilled in the art. As an example, in certain embodiments, there could be a single LED 36. Additionally, it is contemplated that the optics, holes and LEDs can be arranged in various other configurations as desired.

Mask 50 is a camouflaged component colored to match the camouflaged coloring of housing 12, and thus match the camouflaged scheme of the vehicle. In this way, the same color as the housing 12 color is visible through clear lens 14, furthering the camouflaged design of lamp 10. In other embodiments, mask 50 may be absent and circuit board 40 (or another component visible through lens 14) is colored to match the housing 12 camouflage color, and thus match the camouflaged scheme of the vehicle.

Intermediate housing component 42 is positioned behind circuit board 40 and defines a recessed portion 54 configured to receive optional plate 44. In such embodiments having plate 44, wire seals 55 may be used to secure plate 44 within recessed portion 54. In certain embodiments, plate 44 is a heat sink plate designed to pull heat away from LEDs 36 and 38. Additionally, component 42 includes projections 56 which align with channels 51 defined in circuit board 40 to urge circuit board 40 toward front housing component 30 upon assembly of lamp 10. As illustrated, projections 56 are designed to extend at least partially through channels 51, the projections and the channels being of the same pattern, to maintain proper positioning of circuit board 40. Component 42 also may include an outer ridge 57 configured to surround circuit board 40. Accordingly, outer ridge 57 defines a shape substantially the same as the outer shape of circuit board 40, such that circuit board 40 and component 42 nest together upon assembly of lamp 10.

Gasket 46 is optionally positionable between intermediate housing component 42 and rear housing component 32, and defines a hole 60 to allow for passage of the electrical conducting wires or cables which electrically couple with circuit board 40. Additionally, in certain embodiments recessed portion 54 of intermediate housing component 42 may protrude through hole 60 upon assembly of lamp 10. The lamp 10 may include any appropriate wiring harness 24 that, as is known in the art, provides a means of coupling conductive paths to the LEDs 36 and 38 on circuit board 40 for selective activation of the LEDs. In the illustrated embodiment, wiring harness 24 includes plug ends 25 which can couple with the back of circuit board 40 to provide power to LEDs 36 and 38. As illustrated, wiring harness 24 may pass through a typical electrical box 62 which resides in rear housing component 32. Other configurations for coupling a source of power to the LEDs will be readily apparent to those of ordinary skill in the art.

Rear housing component 32 defines a rear hole 70 for entry of wiring harness 24 into housing 12 to electrically couple conductive paths to LEDs 36 and 38 mounted on circuit board 40. Additionally, a ring 72 may be positioned within hole 70 to assist in maintaining the proper positioning of the wires or cables comprising wiring harness 24 with respect to rear housing component 32. Upon assembly, front housing component 30 may be connected with rear housing component 32 via screws 34 as discussed above. In such embodiments, front housing component 30, gasket 46 and rear housing component 32 define screw holes to receive the screws 34. In certain embodiments, lamp 10 may be injected with thermally conductive potting either before or after assembly of the lamp. It should be appreciated that the housing components may be connected together in other appropriate manners as are generally known. Additionally, it is contemplated that the lamp according to the present disclosure may be initially assembled without rear housing component 32 or gasket 46, and connected with a housing bucket at a later time.

In view of the foregoing, and while the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

What is claimed is:

1. A composite lamp assembly for use on a camouflaged military vehicle, comprising: a lamp housing colored to match the camouflaged scheme of the vehicle, wherein said lamp housing defines an interior space, a first opening in communication with said interior space, and a plurality of second openings in communication with said interior space; a clear lens attached to said housing to occupy said first opening; a plurality of diffusers attached to said housing to fully occupy and close said plurality of second openings, wherein said diffusers are colored to match the camouflaged scheme of the vehicle; a circuit board arranged within said interior space of said lamp housing; a first plurality of colored LEDs mounted on said circuit board and positioned to provide non-white light through said clear lens; and a second plurality of colored LEDs mounted on said circuit board and positioned to provide non-white light through said diffusers.

2. The assembly of claim 1, further comprising at least one visor extending outward of said housing above said diffusers to shield light emitted from said second plurality of colored LEDs.

3. The assembly of claim 1, wherein said diffusers are at least partially recessed within said housing.

4. The assembly of claim 1, further comprising a lamp housing bucket, wherein the lamp housing is connectable to said lamp housing bucket.

5. The assembly of claim 1, further comprising a wiring harness coupled to said circuit board to couple the conductive paths to said first and second pluralities of colored LEDs.

6. The assembly of claim 1, wherein said clear lens is non-reflective to substantially diffuse external light impinging upon said clear lens.

7. The assembly of claim 6, wherein said clear lens is textured.

8. The assembly of claim 1, further comprising an armored military vehicle, wherein the lamp assembly is mounted on said armored military vehicle.

9. A composite lamp assembly for use on a camouflaged military vehicle, comprising: a camouflaged lamp housing, wherein said lamp housing defines an interior space and includes a front cover having a clear lens and a plurality of second openings; a plurality of camouflaged diffusers separate from said clear lens; the plurality of camouflaged diffusers fully occupying and closing the plurality of second openings in the lamp housing;
   a camouflaged component arranged within said interior space and positioned behind said clear lens such that at least a portion of said component is at least slightly visible through said clear lens;
   a first LED arranged within said interior space and positioned to provide light through said clear lens substantially without light passing through said camouflaged diffuser; and
   a second LED arranged within said interior space and positioned to provide light through said diffuser substantially without light passing through said clear lens.

10. The assembly of claim 9, further comprising a circuit board arranged within said interior space of said lamp housing, wherein said first and second LEDs are mounted on said circuit board.

11. The assembly of claim 9, wherein said camouflaged component is a circuit board, and wherein said first and second LEDs are mounted on said circuit board.

12. The assembly of claim 9, wherein said first and second LEDs are operable to emit non-white light.

13. The assembly of claim 9, wherein at least one of said first and second LEDs is operable to emit white light.

14. The assembly of claim 9, further comprising a first plurality of LEDs including said first LED and a second plurality of LEDs including said second LED.

15. A composite lamp assembly for use on a camouflaged military vehicle, comprising:
a first lamp portion operable to indicate at least the presence, turning and stopping of the vehicle; and
a second lamp portion operable to indicate at least the presence and stopping of the vehicle during nighttime convoy travel;
wherein said first lamp portion includes at least a first colored LED mounted within a camouflaged lamp housing and a clear lens covering said first colored LED, wherein said first colored LED is operable to emit non-white light directed at the clear lens;
wherein said second lamp portion includes a plurality of openings defined in the lamp housing, a plurality of second colored LEDs mounted within the camouflaged lamp housing and a plurality of camouflaged diffusers covering said second colored LEDs, and fully occupying and closing the plurality of openings, wherein said second colored LEDs are operable to emit non-white light directed at the diffuser.

16. The assembly of claim 15, further comprising an armored military vehicle, wherein the lamp assembly is mounted on said armored military vehicle.

17. The assembly of claim 15, wherein the diffuser is at least partially translucent such that the non-white light emitted from said second colored LED at least partially passes through the diffuser.

18. The assembly of claim 15, wherein said second lamp portion further includes at least one camouflaged visor mounted to the camouflaged lamp housing to reduce the visibility of non-white light emitted from said second colored LED from above the lamp assembly.

19. The assembly of claim 15, wherein said clear lens is non-reflective to substantially diffuse external light impinging upon said lens.

20. A lamp assembly for use on a camouflaged military vehicle, comprising:
a camouflaged lamp housing having a camouflaged front cover piece, wherein said lamp housing defines an interior space and said front cover pieces defines a plurality of openings in communication with said interior space to provide blackout lighting;
at least one camouflaged diffuser attached to said front cover piece to fully occupy and close said plurality of openings
a circuit board arranged within said interior space of said lamp housing;
a plurality of colored LEDs mounted on said circuit board and positioned to provide non-white light through said camouflaged diffuser; and
at least one camouflaged visor attached to said front cover piece above said camouflaged diffuser to reduce the visibility of non-white light emitted from said colored LEDs from above the lamp assembly.

21. The assembly of claim 20, further comprising an armored military vehicle, wherein the lamp assembly is mounted on said armored military vehicle.

22. The assembly of claim 20, wherein said front cover piece defines an upper hole in communication with said interior space to provide standard vehicle function lighting, wherein said upper hole is separate from said plurality of openings.

23. The assembly of claim 22, further comprising a clear lens attached to said front cover piece to occupy said upper hole.

24. The assembly of claim 23, further comprising a second plurality of colored LEDs mounted on said circuit board and positioned to provide non-white light through said clear lens.

25. A method comprising,
providing rear and front housing components of a lamp assembly to be mounted on a vehicle, wherein said front housing component defines a first larger hole and a plurality of second smaller holes, wherein said rear and front housing components are camouflaged;
positioning a circuit board between said components, said circuit board having a first plurality and a second plurality of colored LEDs mounted thereto;
attaching a clear lens to said front housing component such that said lens covers said first hole, wherein said first plurality of colored LEDs is positioned on said circuit board to emit non-white light directed at said clear lens;
attaching a plurality of camouflaged diffusers to said front housing component such that said diffusers fully cover and close said plurality of second holes, wherein said second plurality of colored LEDs is positioned on said circuit board to emit non-white light directed at said diffusers; and
connecting together said rear and front housing components to form the lamp assembly.

26. The method of claim 25, wherein said attaching said clear lens includes insert-molding said clear lens to said front housing component.

27. The method of claim 25, wherein said attaching said plurality of diffusers includes insert-molding said diffusers to said front housing component.

28. The method of claim 25, mounting the lamp assembly on an armored military vehicle.

29. A method comprising, providing rear and front housing components of a lamp assembly to be mounted on a vehicle, wherein said front housing component defines a first hole, wherein said rear and front housing components are colored to match the camouflaged scheme of the vehicle; positioning a circuit board between said components, said circuit board having a first plurality and a second plurality of colored LEDs mounted thereto; attaching a clear lens to said front housing component such that said lens covers said first hole, wherein said first plurality of colored LEDs are positioned on said circuit board to emit non- white light directed at said clear lens; forming a plurality of diffusers in said front housing component, the front housing component having a plurality of openings, wherein said diffusers fully occupy and close said plurality of openings and wherein said diffusers are colored to match the color of said rear and front housing components, wherein said second plurality of colored LEDs are positioned on said circuit board to emit non-white light directed at said diffusers; and connecting together said rear and front housing components to form the lamp assembly.

30. A composite lamp assembly for use on a camouflaged military vehicle, comprising:
a camouflaged lamp housing including a front housing piece, wherein said lamp housing defines an interior space, wherein said front housing piece defines a first opening in communication with said interior space and a plurality of second openings separate from said first opening in communication with said interior space;

a clear lens attached to said front housing component to occupy said first opening;

a plurality of camouflaged diffusers attached to said front housing component at separate locations from said clear lens to fully occupy and close said plurality of second openings;

a circuit board arranged within said interior space of said lamp housing;

a first plurality of colored LEDs mounted on said circuit board and positioned to provide non-white light through said clear lens and substantially without passing through said camouflaged diffuser; and a second plurality of colored LEDs mounted on said circuit board and positioned to provide non-white light through said diffusers and substantially without passing through said clear lens;

wherein said clear lens and said plurality of diffusers are non-overlapping within said front housing piece such that substantially no light from said first plurality of colored LEDs passes through said plurality of camouflaged diffusers and substantially no light from said second plurality of colored LEDs passes through said clear lens.

31. A composite lamp assembly for use on a camouflaged military vehicle, comprising: a lamp housing including a front cover, wherein said lamp housing defines an interior space, wherein said front cover defines a first opening in communication with said interior space and a plurality of second openings separate from said first opening in communication with said interior space; a lens attached to said front cover to occupy said first opening; a plurality of diffusers attached to said front cover to occupy and fully close said plurality of second openings; a circuit board arranged within said interior space of said lamp housing; a first plurality of LEDs mounted on said circuit board and positioned to provide light through said lens; and a second plurality of LEDs mounted on said circuit board and positioned to provide light through said diffusers; wherein said lens and said diffusers are non-overlapping within said front cover such that substantially no light from said first plurality of LEDs passes through said diffusers and substantially no light from said second plurality of LEDs passes through said lens.

* * * * *